United States Patent Office 2,736,787
Patented Feb. 28, 1956

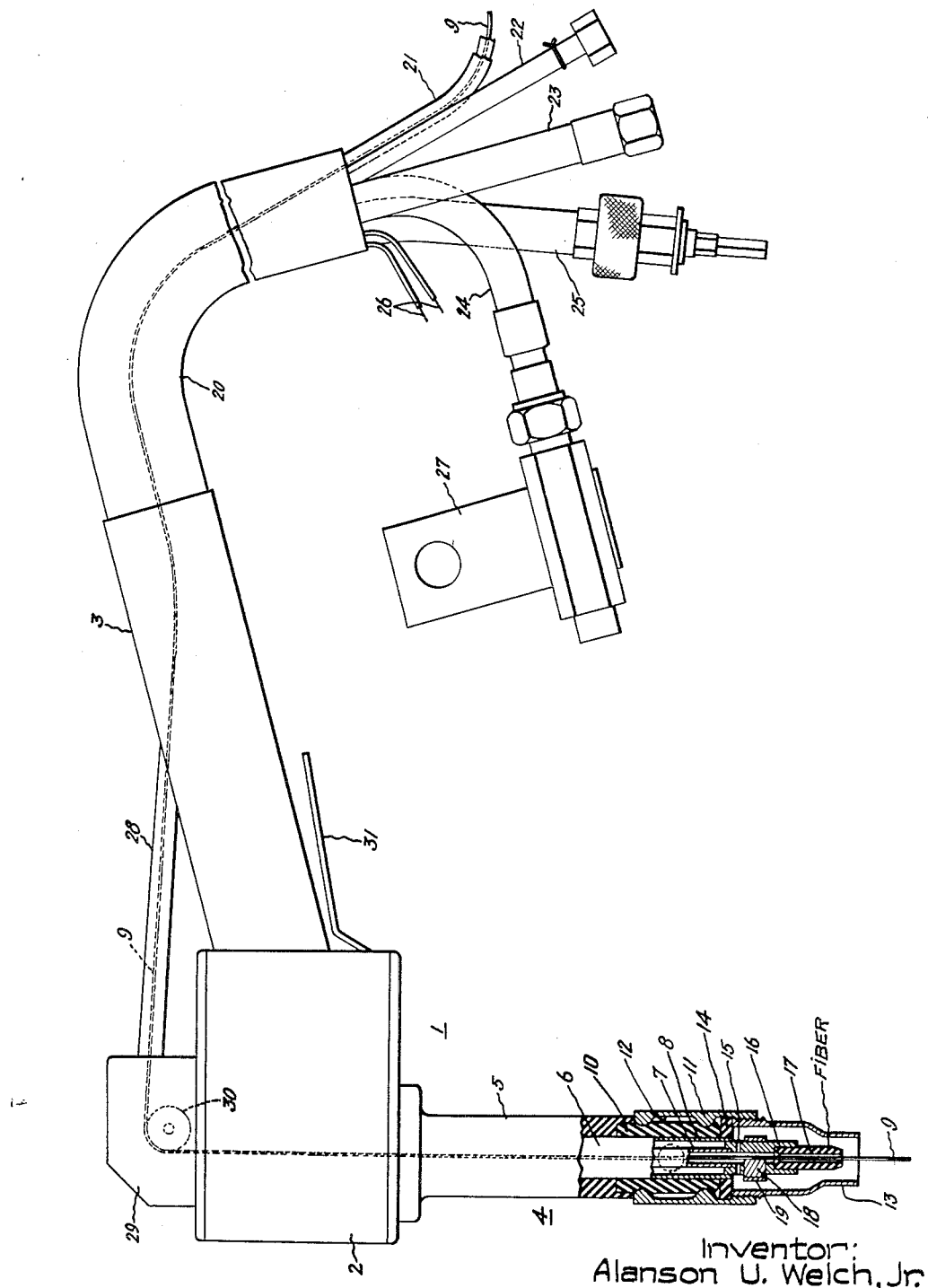

2,736,787

ARC WELDING APPARATUS

Alanson U. Welch, Jr., West Townsend, Mass., assignor to General Electric Company, a corporation of New York Application October 26, 1951, Serial No. 253,282

4 Claims. (Cl. 219—8)

My invention relates to automatic arc welding apparatus and more particularly to an improved construction of the electrode guide forming a part of such apparatus.

In fully automatic, as well as in semi-automatic arc welding, the electrode is mechanically fed toward the work in accordance with its consumption in the welding arc. In metal arc welding the electrode is fused and deposited on the work to form a part of the weld therein and means must be provided for feeding the electrode at a more or less rapid rate depending on the welding procedure employed.

In accordance with one type of inert gas shielded metal arc welding, the welding arc is maintained in an inert atmosphere or argon, helium or a mixture of these gases and operated with reverse polarity at such high current densities in the electrode that a spray deposit of weld metal is obtained. For example, electrodes one-eighth of an inch in diameter or less are supplied with from 170 to 450 amperes of welding current and fed to the work at speeds greater than 100 inches per minute with the electrode feeding rate being balanced against its fusion rate. In this welding procedure, the feeding rate of the electrode may be maintained constant since when properly adjusted minor variations in arc length are instantly corrected by changes in its fusion or burn off rate which occur under these conditions. In other words, the arc has a self-regulating or self-compensatory action which automatically establishes an arc length of predetermined voltage. Consequently, it is desirable to employ this procedure when using semi-automatic apparatus wherein the welding tool is held and manipulated by the welding operator who will not find it possible uniformly to space the hand tool from the work being welded so as manually to maintain a predetermined arc length and voltage during the welding operation.

In apparatus now employed for the above-referred-to method of arc welding, the electrode guide tube is formed of metal and usually has a removable copper tip portion which can be replaced when damaged by the arc striking thereto or by the adherence thereto of the molten end of the welding electrode. When the electrode feeding rate is less than its fusion rate, the electrode will fuse back so that its arcing terminal is within the electrode guide. During this burnback the spray deposit ceases and large drops of molten metal periodically form on the arcing terminal of the electrode.

The welding current value and rate of electrode feed must be carefully adjusted relative to one another to establish the desired welding conditions resulting in the non-sensitive arc referred to above. During this adjustment period, there will be frequent burnbacks resulting in the arcing terminal of the electrode fusing back into the electrode guide. Even after the desired operating conditions have been established, these burnbacks may also happen as a result of many variables which occur during the welding operation such as welding current fluctuations, stoppage or slowdown of the wire feed motor and the like. Such malfunctioning causes a shutdown of at least several minutes duration while the operator removes and discards the electrode guide or the guide tip which has been damaged and installs a new one. This results in a financial loss and of course, insofar as the welding operation is concerned, is annoying and frequently intolerable.

It is an object of my invention to provide for automatic and semi-automatic metal, arc welding apparatus, an improved electrode guide which will eliminate the above-described difficulties.

It is also an object of my invention to provide arc welding apparatus embodying an electrode guide having at its discharge end a fiber tip portion which is of sufficient length to prevent during burnbacks, the arcing terminal of an electrode from coming into engagement with its metallic electrode guide prior to the time of arc extinction due to a lengthening of the arc gap beyond that at which the applied welding current voltage will maintain an arc.

Further objects of my invention will appear from the following description of one embodiment thereof.

When the arcing terminal of an electrode passes up into the fiber tip portion of such an electrode guide, the molten metal of the electrode will not adhere thereto nor will sufficient carbon be formed in the tip bore to permit arcing from the electrode to the tip and thence to the work. Furthermore, when the arcing terminal of the electrode is enclosed within the fiber tip portion of the electrode guide, arc extinguishing gases are obtained which help in snuffing or blowing out the arc.

My invention will be better understood by reference to the following description taken in connection with the accompanying drawing and its scope will be pointed out in the appended claims. The single figure of the drawing shows a hand tool and its flexible connections with the stationary portions of a semi-automatic inner gas shielded metal arc welding apparatus, which is particularly suited for performing the specific welding operation above considered.

As shown in the drawing, the hand tool has a body portion 2 which supports a handle 3 and a barrel 4 having at its outer end a nozzle portion through which the electrode and shielding gas are directed toward the work. The barrel 4 is supported on the body portion 2 of the hand tool by means of an insulating tube 5 whose upper end is flanged to provide a supporting surface which is mechanically attached, for example, by screws, to the bottom portion of the body portion 2 of the hand tool. The insulating tube 5 encloses an electrode guide 6 formed of two concentric tubes 7 and 8. These tubes are spaced from one another to form cooling fluid passageways which are determined by two partitions extending lengthwise of these tubes and between the outer surface of the inner tube and the inner surface of the outer tube. Shielding gas and the welding electrode 9 are fed toward the work through the inner tube 7 of the electrode guide.

A rubber sleeve 10 makes a frictional engagement with the lower portion of the electrode guide 6 and serves as a support for the body portion 11 of the nozzle structure. The sleeve 10 and body portion 11 of the nozzle are so constructed that when assembled as shown in the drawing, they provide a cooling fluid passageway 12 extending circumferentially of the body portion 11 of the nozzle. This cooling fluid passageway 12 is connected with the longitudinal cooling fluid passageways in the electrode guide, by means of two holes each of which extend through the walls of the outer tube 8 of the guide tube and through registering holes in the sleeve 10.

A detachable and replaceable nozzle tip 13 makes a threaded engagement with the outer end of the nozzle body 11. It engages at its inner end a flexible washer 14 which is made of a heat-resisting material such as silicone rubber. The purpose of washer 14 is to provide a gas and water tight connection between the cooling system thereabove, and the gas chamber of the nozzle tip 13.

Gas is supplied to the nozzle tip 13 through a plurality of holes 15 which connect with the longitudinal electrode passageway in an adaptor 16, which in turn registers with the electrode passageway through tube 7 of the electrode guide. The inner end of this adaptor closes the space between the outer ends of tubes 7 and 8 of the electrode guide 6 and its outer end forms a seat for retaining the inner end of the fiber tip 17. This adaptor also serves as a brush holder for a brush 18 which is biased into engagement with the electrode extending therethrough by means of a spring 19 formed by a split ring which is mounted on and encloses the portion of the adaptor wherein the brush 18 is located.

As previously stated, flexible means are provided for connecting the hand tool 1 with the stationary part of the semi-automatic arc welding equipment. These flexible connections are enclosed within a flexible tube 20 and comprise a flexible electrode supply tube 21, a flexible gas supply tube 22, flexible cooling fluid supply and exhaust tubes 23 and 24, a flexible drive shaft 25 and a pair of flexible control wires 26. The exhaust cooling fluid tube 24 encloses a flexible electrical conductor, the outer end of which is provided with a terminal 27 for connection to one terminal of a source of welding current whose other terminal will be connected to the work being welded. Within the hollow box-like body portion 2 of the hand tool, connections are provided for joining the inner end of the gas tube 22 with the interior of tube 7 of the electrode guide, for joining the inner ends of the cooling fluid tubes 23 and 24 with the two passageways formed between tubes 7 and 8 of the electrode guide, and for connecting electrically the welding current conductor in tube 24 with the electrode guide 6. The electrode 9 is fed through supply tube 21 and through a branching connection 28 which extends from the handle 3 to a support 29 mounted on the top outer surface of the body portion 2 of the hand tool. Support 29 provides a mounting for the axle of a guide wheel 30 over which the electrode 9 passes into a feed roll drive enclosed within the body portion 2 of the hand tool. This feed roll drive is mechanically connected to the inner end of the flexible drive shaft 25 by which it is operated to feed the electrode toward the work. A control switch is also located within the body portion 2 of the hand tool and this switch is provided with an operating lever 31 which is located in proximity to the handle 3 so that the operator may manipulate it with the same hand that he uses to grasp the welding tool. The contacts of the control switch are connected to conductors 26 which form part of the control equipment for the apparatus illustrated. For example, these control wires may be employed for stopping and starting the feed motor as well as for additional operations such as completing the welding circuit connection, controlling the flow of shielding gas and cooling fluid and for similar operations.

The construction of the barrel portion 4 of the hand tool and the connection of its elements with the supply tubes enclosed in flexible tube 20 and handle 3 is substantially the same as that shown in United States Letters Patent 2,527,235, granted October 24, 1950, to Roger W. Tuthill and myself and assigned to the assignee of this invention.

As previously stated, the fiber tip 17 of the electrode guide 6 is of sufficient length to prevent the arcing terminal of the electrode 9 from passing therethrough into engagement with the metallic portions of the electrode guide before the welding arc has been extinguished. It is not possible to give specific dimensions therefor in view of the varying conditions encountered in welding. However, when welding with aluminum electrode wire having a diameter of .04 inch which is fed toward the work at 300 inches per minute and supplied with 175 amperes from a source of welding current having an open circuit voltage of 75 volts, a fiber tip having a length of three-quarters of an inch will prove satisfactory for about an eight-hour operating period. During welding even though there be very few arc backs, the fiber tip will slowly erode by reason of its exposure to the heat of the welding arc. Ordinarily, the passageway extending lengthwise of the fiber tip will have a diameter only slightly larger than the diameter of the electrode fed therethrough. When so dimensioned, the fiber tip constitutes a better electrode guide than if the diameter of the passageway therethrough is made much larger than the diameter of the electrode wire. The diameter of the electrode passageway in the tip is not critical with regard to its function in interrupting the arc. The metal on the electrode always burns back until it forms a ball on the end of the electrode. If the diameter of the passageway through the tip is about equal to or slightly larger than the diameter of this ball formed on the arcing end of the electrode, it will fill or substantially fill the passageway and thereby assist in putting out the arc by reason of the fact that the arc-extinguishing gases generated in the fiber tip are forcefully expelled through its open end to quench the arc in much the same fashion as arc interruption is accomplished in an expulsion fuse. I prefer to dimension the electrode passageway in the fiber guide tip so that the ratio of the length of the electrode passageway to its diameter is high enough that when the electrode fuses back sufficiently to form a ball which closes the passageway, the ball is not in contact with the metal portions of the electrode guide behind the fiber tip portion thereof.

The fiber I have been referring to above is often identified as vulcanized fiber. It is a converted cotton cellulous material which has been hardened by a chemical which is later removed, leaving a pure hard tough mechanically strong and electrically insulating material. Fundamentally, it is made by passing a special chemically reactive cotton paper through a zinc chloride bath which attacks and gels the surfaces of the individual fibers of the paper causing them to adhere to each other. After passing through the treating bath, the fibers are pressed together and then run through a series of water tanks to leach out the zinc chloride, leaving the pure converted cellulose which is then dried and pressed. Vulcanized fiber has a very high arc resistance. When it is exposed to an electric arc, it produces arc quenching gases without leaving an electrically conductive carbon deposit on its surface which has been exposed to the arc. The gas that is formed by the arc is electrically neutral and contains a substantial amount of water vapor, approximately 4 to 7 percent thereof. Water vapor is particularly useful in de-ionizing an arc gap.

The fiber tip is suitable for use where the electrode feed through the hand tool is not raised to a high enough temperature to char or burn through the side walls of the electrode passageway in the tip. Thus, while a fiber-tipped electrode guide is well suited for electrodes of aluminum or an alloy of aluminum, it is not suited for use with electrodes of stainless steel which must be operated at such high current densities that the tip portion of the electrode is at a red heat. For use in welding with stainless steel electrodes, the fiber tip may be replaced by a ceramic material which has a high fusion temperature and is non-adhesive with respect to molten stainless steel. Of course, the ceramic material must be formed of an arc-resisting material which is also electrically insulating.

In connection with the welding of aluminum wherein an aluminum electrode is used, I have determined that certain other substitute materials may be used in place of fiber. In each case, these materials are non-metallic, electrically insulating and have low mechanical adherence or high release qualities with respect to the molten metal of the electrode. They also liberate arc quenching gases and in most cases are non-fusible at arcing temperatures.

Soapstone, which is a hydrous magnesium silicate, acts as a satisfactory substitute due to its qualities including the liberation of water vapor at the arcing terminal of the electrode. Also, like fiber, its surface exposed to the arc is self-clearing and self-renewing in that it disintegrates and powders off without leaving a carbon deposit which would form a conductive connection extending lengthwise of the tip. Silicone rubber is also effective, but in view of its low mechanical strength, it should be reenforced by some other material which is not exposed to the welding arc. I have also found that solid polymeric tetrafluoroethylene, which is known by the commercial name of Teflon, is also a satisfactory material for serving the functions performed by the fiber tip. This latter material, however, melts at a fairly low temperature and is consequently not a preferred material.

Some materials are not satisfactory because of one or more bad qualities. Thus, for example, a phenolic resin such as Bakelite cracks and chars quite badly in the presence of an arc. Furthermore, it liberates gases having a very disagreeable odor. The molten end of an electrode will fuse fast to tips made of carbon, unfired lava, quartz, and Transite, thus jamming the electrode guide and preventing the feed rolls of the hand tool from feeding the electrode to the work after an arc back has occurred. Polystyrene is likewise not satisfactory because it burns with a flame and the liberation of much soot.

In view of the above comments with regard to substitute materials and the function performed by the fiber tip of my improved electrode guide, it is believed to be apparent that other substitute materials will suggest themselves to those skilled in the art. These materials should be non-metallic, electrically non-conducting and have a low mechanical adherence or high release quality with respect to molten metal. The substitute material should also be durable and self-cleaning or self-healing at its arcing surface. It is also preferable to have a material which will, in the presence of the arc, liberate an arc extinguishing gas under conditions that do not produce conductive carbonization of the surface thereof which is exposed to the arc.

The fiber-tipped electrode guide of my invention will greatly simplify the control used for electrode feeding and for controlling the supply of welding current to the electrode. It will eliminate the necessity for contactors in the welding circuit for starting and stopping the flow of welding current and consequently the arc. It will also eliminate the requirement of any electrode retracting mechanism for drawing the end of the electrode back into the electrode guide so that, with the power on, the hand tool may be laid on the work or moved relative thereto without striking an arc which might flash the operator's eyes when his eye shield is up or which might damage the work or adjacent material by the accident established of an arc. With a hand tool embodying applicant's invention, it is only necessary to press the switch lever to start the electrode feed until one or two inches is protruding from the nozzle of the hand tool and then strike an arc in the usual fashion. The welding operation may be stopped by either withdrawing the hand tool from the work or merely releasing the feed control switch lever and allowing the electrode to burn back into the fiber tip of the electrode guide.

Although I have shown my invention as applied to a hand tool which is employed for performing a particular kind of inert gas shielded metal arc welding, it is quite apparent that it may be used in any fully automatic or semi-automatic arc welding apparatus. For example, the insulating tip of the electrode guide will prove to be quite useful in submerged melt arc welding wherein the discharge end of the electrode guide is buried in a pile of flux which is placed on the work along the line of welding. This and other applications of my invention will occur to those skilled in the art and I intend, therefore, by the appended claims to cover all such modifications and applications of my invention as fall within the true spirit and scope thereof.

What I claim as new and desire to secure by Letters Patent of the United States is:

1. Arc welding apparatus comprising a metallic guide having an electrode passageway therethrough, means for feeding an electrode through said passageway in said guide, means for supplying welding current to an electrode in said guide from a source of welding current of predetermined maximum voltage, and a fiber tip mounted on the discharge end of said metallic guide and having an electrode passageway therethrough which forms a continuation of the electrode passageway in said guide, said tip having a length which is effective, when the fusion rate of said electrode is greater than its feeding rate, in preventing the passage of the arcing terminal of said electrode through said tip and into engagement with said metallic guide prior to arc extinction due to a lengthening of the arc gap beyond that at which said welding current maximum voltage will maintain an arc.

2. Arc welding apparatus comprising a metallic guide having an electrode passageway therethrough, means for supplying welding current to an electrode in said guide from a source of welding current, means for feeding an electrode through said passageway in said guide to compensate for its fusion rate by an arc at its terminal during welding, and a fiber tip mounted on the discharge end of said metallic guide and having an electrode passageway therethrough which forms a continuation of the electrode passageway in said guide, said tip having a length relative to the diameter of said electrode passageway therethrough and the diameter of an electrode being fed through said passageway such that fusion of said electrode back from the outer end of said tip by said arc produces a globule of molten metal which substantially fills said passageway within the length of said tip and out of engagement with said metallic electrode guide whereby the arc-extinguishing gases generated in said fiber tip by said arc are forcefully expelled through its open end to quench said arc.

3. Arc welding apparatus comprising a metallic guide having a longitudinal electrode passageway therein and cooling fluid passageways therein adjacent said electrode passageway, means for supplying cooling fluid through said passageways in said metallic guide, means for feeding an electrode through said electrode passageway in said guide, means for electrically connecting said guide with one terminal of a source of welding current of predetermined maximum voltage, means making a sliding engagement with an electrode in said guide for supplying welding current from said guide to said electrode, a fiber tip mounted on the discharge end of said electrode guide and having an electrode passageway therethrough forming a continuation of the electrode passageway through said guide, and means for supplying a shielding gas about said tip and the arcing terminal on an electrode extending therethrough, said tip having a length sufficient, when the fusion rate of said electrode exceeds its feeding rate, to position the arcing terminal of said electrode out of engagement with said metallic guide at the time of arc extinction due to a lengthening of the arc gap beyond that at which said welding current maximum voltage will maintain an arc.

4. Arc welding apparatus comprising a metallic guide having a longitudinal electrode passageway therein and cooling fluid passageways therein adjacent said electrode passageway, means for supplying cooling fluid through said passageway in said metallic guide, means for feeding an electrode through said electrode passageway in said guide, means for electrically connecting said guide with one terminal of a source of welding current, means making a sliding engagement with an electrode in said guide for supplying welding current from said guide to said electrode, a fiber tip mounted on the discharge end of said electrode guide and having an electrode passageway therethrough forming a continuation of the electrode passageway through said guide, and means for supplying a shielding gas about said tip and the arcing terminal on an electrode extending therethrough, said tip having a length relative to the diameter of said electrode passageway therethrough and the diameter of an electrode being fed through said passageway such that fusion of said electrode back from the outer end of said tip produces a globule of molten metal which blocks said passageway within the length of said tip and out of engagement with said metallic electrode guide.

References Cited in the file of this patent

UNITED STATES PATENTS

| | | |
|---|---|---|
| 1,707,433 | Hand | Apr. 2, 1929 |
| 2,510,204 | Baird | June 6, 1950 |
| 2,510,205 | Baird | June 6, 1950 |
| 2,512,705 | Anderson | June 27, 1950 |
| 2,527,235 | Tuthill et al. | Oct. 24, 1950 |
| 2,536,294 | Landis et al. | Jan. 2, 1951 |

FOREIGN PATENTS

| | | |
|---|---|---|
| 371,814 | Great Britain | Apr. 19, 1932 |
| 443,874 | Germany | May 6, 1927 |